Figure 5:
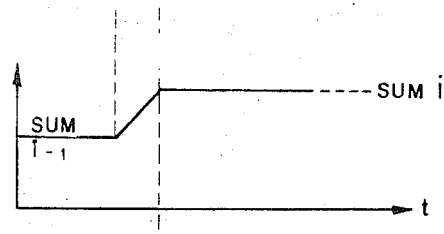

United States Patent [19]
Ott

[11] 3,808,525
[45] Apr. 30, 1974

[54] THICKNESS MEASURING DEVICE FOR INDICATING THE MEAN VALUE OF A PRE-SET NUMBER OF MEASUREMENTS OF THE THICKNESS OF A LAYER

[76] Inventor: Albert Ott, Sindelfingerstrasse 118, 7032 Sindelfingen - 6,, Germany

[22] Filed: June 22, 1972

[21] Appl. No.: 265,224

[52] U.S. Cl. .......................................... 324/34 TK
[51] Int. Cl. ........................................... G01r 33/00
[58] Field of Search .......... 324/34 TK, 40; 328/151; 235/151.3–151.35, 150.53

[56] References Cited
UNITED STATES PATENTS
| | | | |
|---|---|---|---|
| 3,518,430 | 6/1970 | Davis | 235/151.32 |
| 3,566,092 | 2/1971 | Grant | 235/151.3 |
| 3,612,839 | 10/1971 | DeWitt | 235/151.35 |
| 3,705,297 | 12/1972 | John | 235/150.53 |

*Primary Examiner*—Robert J. Corcoran

[57] ABSTRACT

A hand mounted measuring probe feeds measurement signals to the device which forms mean values. The device includes a comparator which operates an operational time stage upon receipt of signals from the probe below a predetermined threshhold. The operational time stage, after a delay interval, operates a measuring time stage for gating the measurement signals to an adding stage during a selected measurement time interval. A divisor stage divides the measurement signals by the number of measurements and the mean value of the measurements is outputted.

7 Claims, 12 Drawing Figures

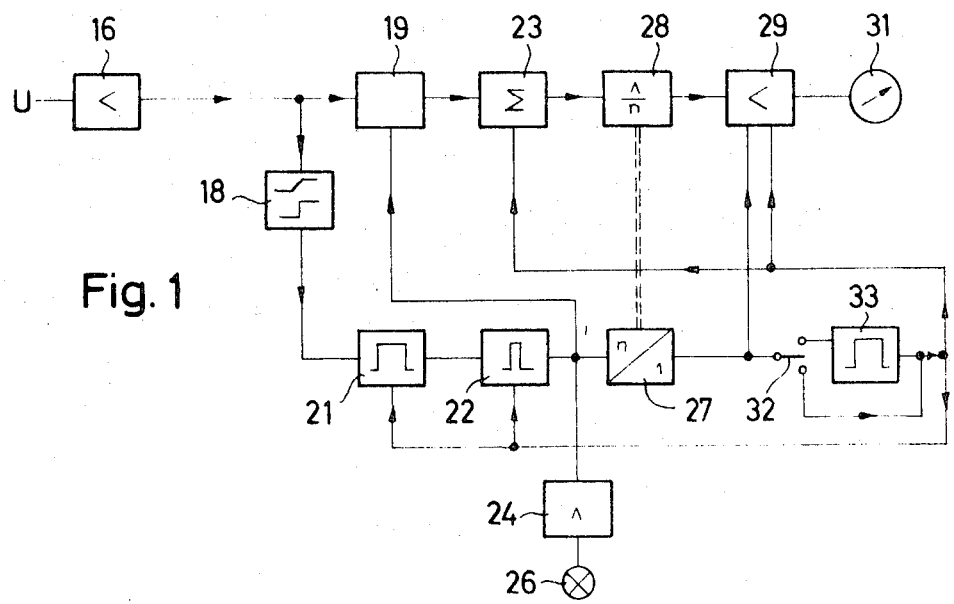
Fig. 1
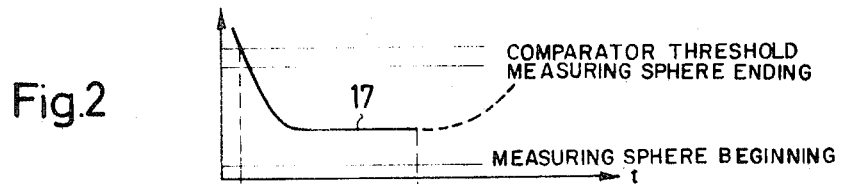
Fig. 2
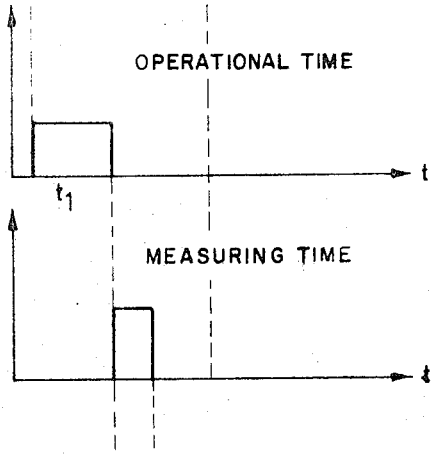
Fig. 3
Fig. 4

THICKNESS MEASURING DEVICE FOR INDICATING THE MEAN VALUE OF A PRE-SET NUMBER OF MEASUREMENTS OF THE THICKNESS OF A LAYER

The invention pertains to a device to measure the thickness of the insulating coatings on nonferrous metals or ferrous metal coatings or nonferrous metal coatings on a magnetic substrate with the aid of manually appliable measuring head and a data output instrument.

Layers of this type are thin and in most cases have a thickness, which is substantially below 1 mm. They are measured by picking up a probe by hand, while coming constantly closer to the layer with the bottom side of the probe, until the bottom side of the probe, for example having three spherical probe contacts, is seated on the upper side of the coating. In the probe is a coil, which is influenced in a degree, determined by the size of the layer's thickness.

In order to calibrate or gauge the device, one first places the probe on uncoated material, and takes such measurement as the lower reference point. However, the uncoated material may be variably rough in different places, and the values of the material correspondingly may be variable. Both are factors that affect the measurement. In order to obtain an accurate lower reference point, one, therefore, makes several, for instance, six measurements, on the uncoated material, and forms the arithmetic mean from these measurements. This mean is formed by writing down the result of the six measurements, adding them, and subsequently dividing by six.

Thereafter, yet a second calibrate or gauge value is required before one can measure. This is achieved by coating a foil of known thickness on the uncoated material and simulating by this a coated material. For the same preceding reasons, several measurements are also made at this point, and the arithmetic mean is formed. By attaining this second gauge point in several ways, it becomes more reliable.

It is evident that a considerable time is required to obtain the mean gauge point and the gauge point for a certain coating thickness, and besides, computation errors may creep in.

Now, if an unknown layer is measured, here, too, there are types of measurements, that require the formation of mean values, i.e., in which one measures in different places. In all these measurements for the purpose of forming the arithmetic mean value, one determines the mean value from the same number of measurements, because it makes little sense, for instance, to make one of the calibration or gauge points substantially more accurate than a different gauge point, or the actual measurement.

It is an object of the invention to specify a device, which excludes errors, which lead to a wrong mean-value formation, either by a wrong number of measurements, either by a wrong addition or by a wrong division. Furthermore, nevertheless, it should be possible to measure substantially faster than hitherto.

In accordance with the invention, this task is solved by providing a comparator, which has a threshold that lies beyond the measurement scope of interest and the input of which is controllable by the measurement signal, and that the comparator controls an operational time stage, the output signal of which has a time period that is equivalent to the complete setting up of the measuring head, and that the operational time stage controls a measuring-time stage, which selects the measuring time, in accordance with its beginning and end, and that a gate is provided, at one input of which the measuring signal, and at the other input of which the output signal of the measurement-time stage are applicable, and that a timely so limited measuring signal is applicable to the adding stage, and that on the way between the input amplifier and the data output instrument a divisor stage is provided, by which the present signal is divisible by the number of measurements.

Further advantages and features of the invention result from the following description of a preferred form of construction.

Illustrated are the following:
FIG. 1 a block diagram,
FIG. 2 thru
FIG. 11 time diagrams, explaining the signal flow and and the procedure,
FIG. 12 a detailed circuit diagram.

FIG. 1 shows an instrument, which, combined with the usual coating-thickness gauges, may form a new, combined instrument or, as a matter of fact, it may be connected as a single instrument to the usual coating-thickness gauges. At the input of the input amplifier 16 stands the measuring voltage U. If the measuring head is yet practically infinitely far away from the layer to be measured, then the input voltage U is also high, as shown by curve 17. The closer the probe comes to the layer, the smaller the voltage becomes, shown by the inclined flank. Finally, if the probe is properly placed, the measuring value no longer varies. By two horizontal lines in FIG. 2 the beginning and the end of the measurement range is shown. The beginning of the measurement range layer corresponds to the layer thickness zero, and the end of the measurement range corresponds to the maximum measurable layer thickness. The measuring voltage U is constantly fed to a comparator 18, and likewise to a gate 19. As shown by FIG. 2, the comparator threshold in this form of construction lies scarcely above the end of measurement range. Only when the measuring voltages lies below the comparator threshold, i.e., when the probe was placed sufficiently close to the layer to be measured, the instrument starts running, according to FIG. 1. The inclined branch of curve 17 is unusable for the measurement, since in this case the probe is not properly positioned yet. When the measuring voltage equals the comparator threshold, the comparator 18 gives an output signal to the positioning or operational time stage 21, as shown by the left-downward projected dotted line between FIGS. 2 and 3. The operational time stage 21, itself, after a time interval T1, emits an output signal, and thus represents a delay stage. The delay interval is selected in such a way, as to make sure that the probe is properly placed. After this time the operational time stage emits an impulse to a measuring-time stage 22, which in turn now emits the impulse shown in FIG. 4.

Figure 6:
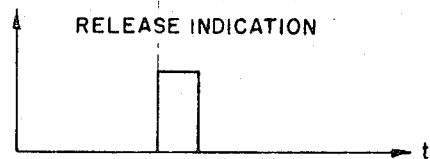
Figure 7:
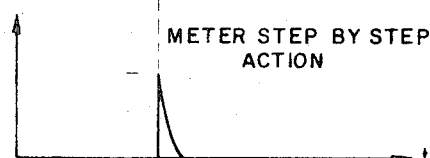
Figure 8:
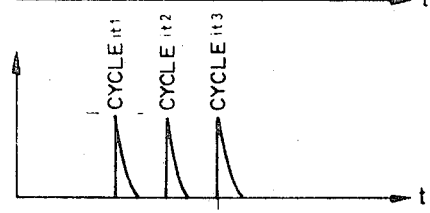

Beginning at its leading edge to its trailing edge the gate 19 is regulated. According to FIG. 2, a constant measuring voltage is applied during this time, which now reaches a summing stage 23. This sums up linearly and stores the result. According to FIG. 5, a sum of $i - 1$ was previously summed up in the summing stage 23, and after the summation, a sum $i$ is now in the summing stage 23. By the trailing edge of the pulse from the measuring-time stage according to FIG. 4, the gate 19 is again closed and simultaneously by the trailing edge an unblocking stage 24 is triggered which causes a light producer 26 to light up. FIG. 6 shows this light impulse. The trailing edge of the measuring-time impulse according to FIG. 4 is differentiated. By this a negative pulse according to FIG. 7 is obtained which increases the content of a counter 27 by one. This counter was preset to the No. 4, i.e. the mean value is to be formed from four measurements. A dividing stage 28 is electrically connected to counter 27. The divider stage 28 divides with the number to which the meter 27 was preset. In the present case, one divides by the number 4.

Figure 9:
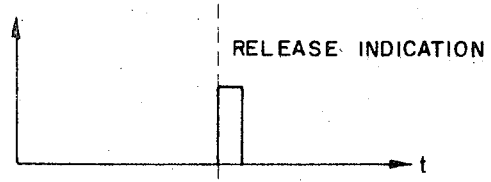
Figure 10:
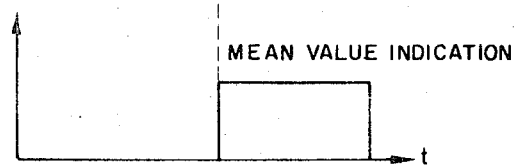
Figure 11:
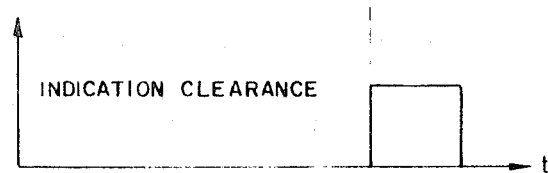

Therefore, the measuring probe is yet placed in various places three times and the ending of each such process results in pulse increasing the content of the counter 27 as shown by Diagram 8. Upon the fourth stepping impulse, also the last unblocking stage 24 indication, according to FIG. 9, is released. Now, if the counter 27 is full, the pulse, shown in FIG. 10, appears at its output. Latter releases an output amplifier 29, following the divider stage 28, so that during the entire time of the impulse, according to FIG. 10, the mean value from the four measurements can be read from an indicator 31. After its reading one can turn a selector switch 32 to its lower position. Thus the output of the output amplifier 29 is switched off, and the indication extinguishes. Simultaneously, the operational time stage 21, too, and the measuring time stage 22 are reset. If one switches the selector-switch 32, according to FIG. 1, to the top, the measuring-value storing stage 33 is connected to the counter 27. This stage causes the reading to be automatically cleared after a certain time interval. The individual structural components of this instrument can also be shifted, combined with each other, or assembled in a different manner. For example, the input amplifier 16 is only required, if the the fed-in signal is too low. The divider stage 28 may at any point between the input amplifier 16 and the indicator 31 be provided for. The summing stage 23 may be combined with the output amplifier 29. The indicator 31 need not necessarily be an indicator device, from which an operator reads. Rather, it may be an output instrument, which transmits the received data to a data-processing installation. In the form of construction the number of the measurements to be performed was preset. Instead, one could also have the counter 27 count the measurements, and to regulate the divider stage 28 by the counter 27. In this case, in five measurements, for example, the counter 27 places the divisor stage 28 in a position, which is divided by 5, and in the case of ten measurements, the meter would have to see to it that the divisor stage be divided by 10, etc. However, this has the disadvantage that one must remember the number of measurements, because there is no sense in deriving the measuring point from the measurement of four individual measurements, and another measuring point from the measurement of six individual measurements.

Figure 12:
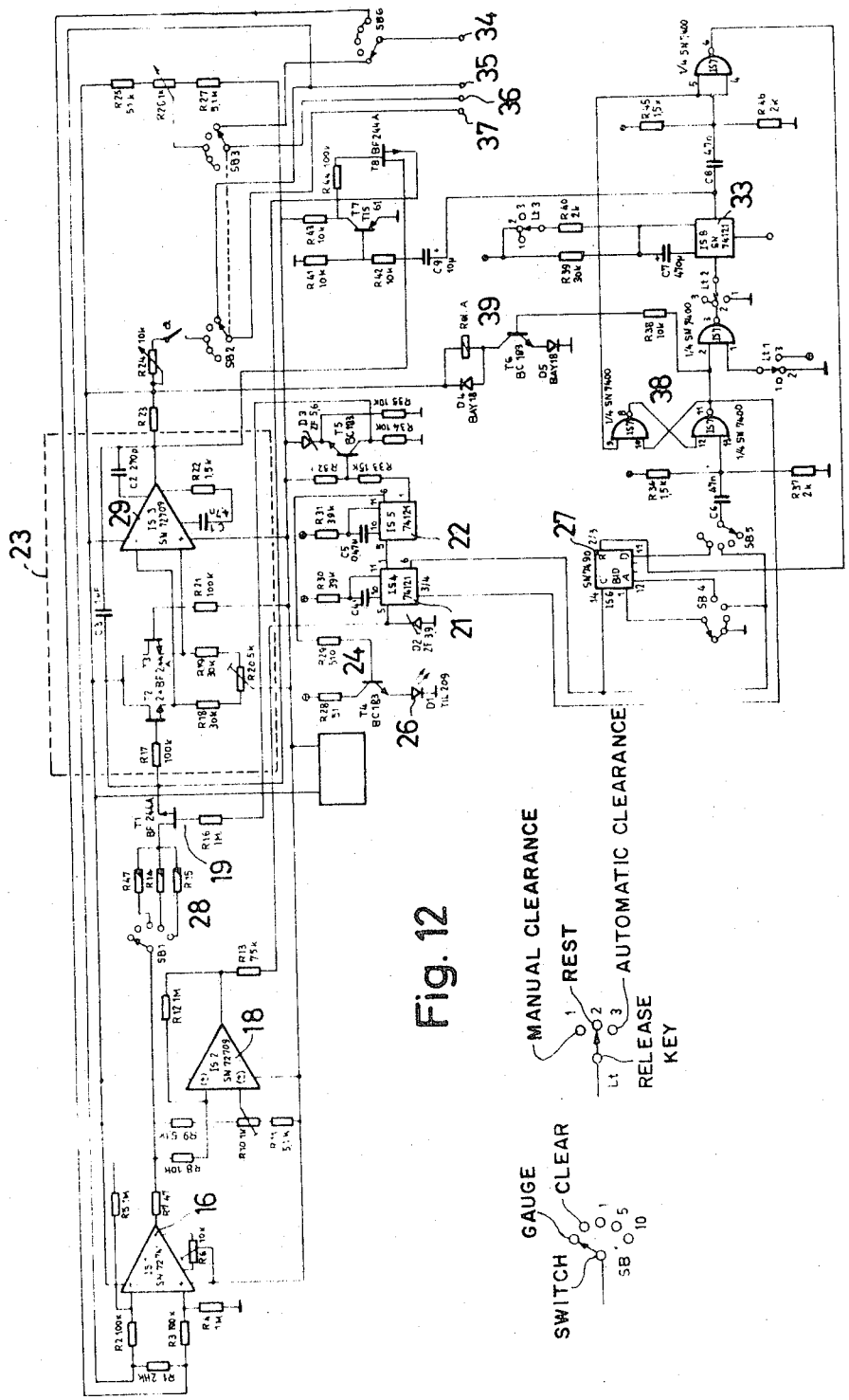

Instead of a light producer 26 the unblocking stage 24 may, also control a sound-wave producer, or any other indicator device. FIG. 12 shows an actually performed circuit. For a specific embodiment of the invention, one specifically refers to this wiring diagram. Respective parts received the same number as in FIG. 1. The terminal 36 to the extreme right has reference voltage level. The voltage to be measured is fed between the terminals 34, 35, and is connected according to the position of the switch SB2, SB3, SB6, to the input amplifier 16. The resistances R2, R3, R5 determine the amplification factor, and serve to optimize the in-phase rejection. The resistor R1 serves as a definite load to the measuring circuit. R6 serves the internal amplification symmetrization of the input amplifier 16. R47 is a protective resistor for the output of the input amplifier 16. The voltage divider made of resistors R9, R10, R11, determines the comparator threshhold. R8, R12 determine the comparator hysteresis. R13 is a protective resistor for the comparator 18. The switch SB1, combined with the resistors R47, R14, R15, forms the divider stage 28. R47, R14, R15 determine the factor $1/n$, i.e., for the values $n = 1$, $n = 5$, and $n = 10$. The transistor T1 forms the gate 19. R16 is a protective resistor. The subsequent dottedly framed small box forms the summing stage 23. Individually, it comprises a high-impedance preamplifier stage consisting of the transistors T2, T3, and the output amplifier 29. From the output of the output amplifier 29 leads a feed back branch via C3 to a point before R17. By this feed back this point is maintained at virtually zero. The deviation from the zero potential are several microvolts. Thus the source potential of T1 equally is zero. Therefore, an ideal switch operation exists in all occurring measuring voltages. R17 and R21 are protective resistors for T2 and T3. R18 and R19 are their emitter resistors. R20 is a symmetrizing resistor for T2 and T3. R23 is a protective resistor for the output amplifier 29. By the potentiometer R24 one can set the indicator 31 to the full scale deflection which is ascertained from the arithmetic mean of several measurements. With the potentiometer R26 the initial value is set, which is ascertained by the formation of the arithmetic mean. During calibration the initial value is set prior to the full scale deflection in order to avoid alternate influencing.

The switches SB1 to SB6 are mechanically connected to each other, and each switch is realized by the switching range of a special plate. According to FIG. 12, left top, that position serves for calibration or gauging, in which all SB switches are in the positions, according to FIG. 12. The next position serves to clear the stored arithmetic mean value. The third position serves to measure without formation of a mean value, i.e., $n = 1$. The fourth position serves to form an arithmetic mean value from five measurements, and the last position serves to form the arithmetic mean value of ten measurements.

Therefore, in the third position only one the measuring recording is processed which, naturally, does not result in any formation of a mean value.

As shown by FIG. 12, in the calibrating or gauging position the measuring value does not reach electronics, but is switched back by the switches SB2, SB3. One concludes from this that in this form of construction the instrument is designed as a separate instrument for the particular measuring instrument, since, if the position "gauging" were not provided according to the invention device one would have to additionally provide the particular measuring instrument with it. The gauging process takes place in such a manner that the probe is first placed in any point. To this value the indicator 31 is subsequently gauged. However, this is only pre-gauging, because the probe, with little likelihood, will be placed in such a spot, that is equivalent to the meanvalued layer thickness. In the "gauging" position one only obtains pre-calibration. Thereupon, one carries out a gauging in the fourth or fifth position, forming a mean value, according to the outcome of which the initial value with R26 and the final value with R24 will definitely be set.

The measuring voltage is summed up in the capacitor C3, where it remains charged until cleared.

As elements determining the time constant R30, C4, R31, C5, respectively, belong to the operational time stage 21 and to the measuring time stage 22. Since the comparator 18 switches from plus 15 volts to minus 15 volts, a zener diode D2 is required, to limit the input of the operational time stage 21. T5 forms the control stage for Gate 19. Essentially, it serves only as amplifying switching stage. D3 again serves to limit the voltage. T4 represents the unblocking stage 24, which controls a light-emitting diode D1, which forms the light producer.

As one sees, differently from FIG. 1, the operational time stage 21, in this case, controls the counter 27 with its output impulse. Principly, it does not matter, whether this counter 27 is controlled by the impulse, according to FIG. 3, or the impulse, according to FIG. 4. The counter 27 has several connections, of which the input 2 is represented by the connection 14. In the third position of the switch SB5, i.e., in the position, in which the measurement is taken without forming the mean value, the impulse, however, reaches the capacitor C6 directly, and it is not subdivided, i.e., the ratio is 1 : 1.

If one wants to subdivide 1 : 5, SB4 is in its fourth position. Since the distance from terminal 1 to terminal 11 of the counter 27 represents a five-unit counter at the terminal 11 of the counter 27 appears only each fifth impulse.

If one wants to divide by 10, the signal first reaches the terminal 14, again emerges subdivided 1 : 2 at the terminal 12, and is refed to the counter at terminal 1, and appears at terminal 11 five times subdivided, i.e., 10 times subdivided in all. The ends of R36 and R37 are A.C. ground and combined with C6 therefore form a differentiation unit. The set-reset-stage 38 is switched by the negative slope of the impulse appearing at the output of SB5. Its input 13 can only be controlled only once, and further signals trigger this stage 38 in no other condition. If one wants to reset them, one must trigger the input 9. The indication release stage 39 is controlled from the output 11 of stage 38, which also comprises the transistor T6. In this case, one can clear the reading after each first, fifth, or tenth measuring process, and stage 38 prevents that depending on the switch position any number of measurements be considered in excess of the number 1, 5, or 10. The relay A of the indicator-clearance stage 39 switches on the contact a at the right of R24.

As already explained in FIG. 1, the reading can be cleared manually or automatically. For manual clearance, the switch Lt2 is brought to its position 1. Thereby, IS8 is impulsed, and after expiration of the indicating time, i.e., at the end of the impulse, according to FIG. 10, a negative impulse appears at the output of IS8, which is connected via C9 to T7, and briefly opens T8. Since T8 lies parallel to C3, C3 is completely discharged. In the case of manual clearance, a differentiated impulse simultaneously runs via C8 to IS7. This differentiated impulse also reaches the input 9 of the set-reset-stage 38, and resets it, and besides, an impulse from output IS7 reaches the counter 27, and resets it, too. The release key LT — as shown in FIG. 12 — equally has three ranges, which are marked by the additional members 1, 2, 3. When clearing manually the release key was in its position "1." When clearing automatically the release key LT is in its position "3." This position is detentable. In this position the output 11 can emit one impulse from IS7 to the input 2 of IS7, which now also goes to IS8. The procedure then is subsequently the same, as already explained above in the case of manual clearance. The four IS7-stages in lower right of FIG. 12 are all situated on the same chip, and have the same structure.

Therefore, the circuit insures that the mean-value formation is done correctly. With too few individual measurements, while following the correct way, it does not show a result, and with too many individual measurements, it cuts off the superfluous measurements.

What is claimed is:

1. Device for measuring the mean value of a pre set number of measurements of the thickness of a layer on a substrate for use in combination with a thickness measuring probe that is positioned on said layer, said probe generating a signal which decreases as said probe is brought into measuring position adjacent the layer and data output means comprising comparator means connected to said probe and controlled by measuring signals from said probe, said comparator means having a threshold at a probe signal level higher than the maximum thickness to be measured to thereby generate a control signal as said probe approaches said layer, time delay means controlled by said comparator means control signal and providing a delay signal that permits the proper placement of the measuring probe on the layer, means controlled by the delay signal of said time delay means for generating a signal which establishes the beginning and the end of the measuring time interval, gate means having an input connected to said probe for receiving the measurement signals and a control input connected to said last named means for receiving a control signal from said means for establishing the measuring time interval, said latter signal opening and closing said gate means during the measuring time interval, adding means connected to the output of said gate means having an input for receiving input signals during measuring time intervals, dividing means connected to said adding means for dividing the measurement signals by the amount of said pre set number of measurement, pre-settable counter means set to said pre set number of measurements and connected to be controlled by said comparator means control signals coupled with said dividing means for counting said comparator means control signals, one signal being generated for each individual measurement, said counter means being connected to said adding means for automatically controlling the release of output data from said means to said data output means upon counting said pre-set number of measurements, and reset means connected to reset various means of the device for further use following the release of output data.

2. A device according to claim 1 in which indicator means is connected to said means for establishing said measuring time interval to indicate the end of each individual measurements.

3. A device according to claim 1 in which said dividing means is linear.

4. A device according to claim 2 in which said indicator means provides an optical indication.

5. A device according to claim 2 in which said indicator means provides an acoustic indication.

6. A device according to claim 1 in which said gate means comprises a field-effect transistor having source means impulsed by the measurement signals and a gate impulsed by control signals from said means for establishing the measuring time interval.

7. A device according to claim 1 comprising means for recording the mean values computed by the device.

* * * * *